United States Patent
Bayer et al.

[19]

[11] Patent Number: 5,890,413
[45] Date of Patent: Apr. 6, 1999

[54] PISTON FOR WATER PUMP AND RELATED METHOD

[75] Inventors: Don Bayer, Dousman; Herb Hoenisch; Robert D. Kern, both of Waukesha; Gerald C. Ruehlow, Oconomowoc; Wes Sodemann, Dousman, all of Wis.

[73] Assignee: Generac Portable Products, LLC, Jefferson, Wis.

[21] Appl. No.: 780,520

[22] Filed: Jan. 8, 1997

[51] Int. Cl.⁶ ..................................................... F01B 3/00
[52] U.S. Cl. .................................................. 92/71; 92/248
[58] Field of Search ........................................ 92/71, 248

[56] References Cited

U.S. PATENT DOCUMENTS

| | | |
|---|---|---|
| 1,193,434 | 8/1916 | Sharpneck . |
| 3,497,038 | 2/1970 | Schrader ................................... 92/248 |
| 3,507,584 | 4/1970 | Robbins ...................................... 92/71 |
| 3,820,523 | 6/1974 | Showalter et al. . |
| 4,325,647 | 4/1982 | Maier et al. . |
| 4,366,785 | 1/1983 | Goloff et al. . |
| 4,404,935 | 9/1983 | Kraft . |
| 4,474,382 | 10/1984 | Hjelsand ................................... 277/59 |
| 4,495,855 | 1/1985 | Murakami et al. ......................... 92/71 |
| 4,508,067 | 4/1985 | Fuhrmann . |
| 4,614,453 | 9/1986 | Tsuno et al. . |
| 4,643,144 | 2/1987 | Fingerle et al. . |
| 4,667,627 | 5/1987 | Matsui et al. . |
| 4,709,621 | 12/1987 | Matsui et al. . |
| 4,759,110 | 7/1988 | Rieger et al. . |
| 4,794,894 | 1/1989 | Gill . |
| 4,806,040 | 2/1989 | Gill et al. . |
| 4,848,286 | 7/1989 | Bentz . |
| 5,038,673 | 8/1991 | Schulze ....................................... 92/71 |
| 5,094,150 | 3/1992 | Russner et al. . |
| 5,279,211 | 1/1994 | Bentz et al. .............................. 92/248 |
| 5,392,693 | 2/1995 | Engel et al. . |

FOREIGN PATENT DOCUMENTS

| | | |
|---|---|---|
| 103-906-A | 3/1984 | European Pat. Off. . |
| 172478(4) | 10/1983 | Japan . |
| 2127928 | 9/1983 | United Kingdom . |

OTHER PUBLICATIONS

Brown, M, Seals and Sealing Handbook, 4th Edition, Oxford, UK, Elsevier Science Publishers, LTD., 1995, pp. 190, 312, 313, 517, 518.

*Primary Examiner*—F. Daniel Lopez
*Attorney, Agent, or Firm*—Jansson, Shupe, Bridge & Munger, Ltd.

[57] ABSTRACT

Disclosed is a piston for a water pump, e.g., a pressure washer pump. The piston includes a piston body and a piston head and in the improvement, the piston body is solid, homogeneous ceramic. That is, the piston body has a generally cylindrical surface and the body is circumscribed by the surface and is homogeneous ceramic. A method for making a piston for a water pump includes the steps of providing a piston body made of a ceramic material, and making a piston head of steel and having a pocket formed therein. The head is heated, the pocket and the body are engaged in overlapping relationship and the head is allowed to cool and "shrink-fit" to the piston body. The piston head is formed to have a relief groove circumscribing the pocket for reducing compression forces resulting from such cooling.

4 Claims, 4 Drawing Sheets

PISTON FOR WATER PUMP AND RELATED METHOD

FIELD OF THE INVENTION

The invention relates generally to power plants and, more particularly, to pressure washers having a water pump driven by a prime mover such as an electric motor or an internal combustion engine.

BACKGROUND OF THE INVENTION

Products known as pressure washers are used for a wide variety of washing applications. A few such applications include washing building walls, removing paint and stains, washing such items as bicycles and golf carts, and cleaning sidewalks and driveways. Some pressure washers incorporate a venturi device whereby chemical cleaning liquids may be aspirated into and mixed with the water stream. Pressure washers are used by contractors, homeowners and equipment rental businesses, as examples. Generac Corporation, Waukesha, Wis., U.S.A. is a leading manufacturer of pressure washers.

The primary components of a pressure washer include a water pump connected to a source of water such as a garden hose and providing a high-pressure stream or spray of water. The pump is coupled to and driven by a prime mover such as an electric motor or an internal combustion engine.

Because of its high pressure capability, a pump of the reciprocating piston type is usually chosen for pressure washer service. An exemplary piston pump has several (e.g., three) pistons reciprocally moving in respective bores of the pump barrel. The pistons are reciprocated by a rotating "wobble plate"-type cam powered by the prime mover.

A well known water pump arrangement has a housing, the wobble plate cavity of which contains a quantity of oil for lubricating bearings and for maintaining the proximal portions of the reciprocating pistons at an acceptably-low operating temperature, e.g., 260°–270° F.

The cavity and the distal portions of the pistons (which come in contact with and deliver high-pressure water out of the pump) are isolated from one another by appropriate seal arrangements. Such arrangements form a barrier between the oil in the cavity and around the proximal ends of the pistons and the water being pumped by the distal ends of the pistons.

A high pressure water pump represents a severe operating environment for the pistons in it. Special care must be taken to design pistons which not only have acceptable life in the application but which also evidence a cost consistent with the cost and selling price of the pressure washer equipment.

One type of known piston is made of stainless steel with a thin plasma-applied ceramic coating or is made of hardened steel with a phosphatized or "Parkerized" surface treatment. It is believed that ceramic coating of pistons was implemented because one or more of the seals being used therewith is inordinately abrasive and quickly attacks the piston surface finish during pump operation.

Ceramic pistons are disclosed in a number of patent documents including U.S. Pat. No. 4,759,110 (Rieger et al.). The Rieger et al. patent discloses a process for attaching a metal "holder" (shoe) to a ceramic piston. At ambient temperature, the bore of the shoe has a diameter smaller than that of the piston. Attachment is by heating the holder until its bore diameter is greater than that of the piston, placing the pieces together and allowing the shoe to cool.

The patent explains that "optimum" locking of the piston and the holder to one another occurs when (a) the bore and piston diameters are each within a particular range, and (b) the piston end and the holder bore are each prepared to have a particular roughness Ra.

As to structural shape, the end portion of the holder which is perpendicular to the piston long axis is flat. The patent notes that such holder has a relief notch" in order that "uniform stresses are produced in the region of clamping."

U.S. Pat. No. 5,038,673 (Schulze), shows a pump piston, the body of which is ceramic. In the version shown in FIGS. 1, 3a and 4, the piston body has a groove at the head end and a cap-shaped metal contact element over such end. In the arrangements of FIGS. 6, 7, 8, 10, 11 and 14, the contact element is a metal button on the piston end.

U.S. Pat. No. 5,094,150 (Russner et al.) discloses a ceramic piston to which is attached what the patent calls a "metallic drive part," i.e., a shoe. In one arrangement, the ceramic is metallized and the shoe is solder-attached using relatively-common solder. In another arrangement, there is no metallization and the shoe is solder-attached using solder containing, e.g., titanium or zirconium.

U.S. Pat. No. 5,392,693 (Engel et al.) describes a piston assembly having a ceramic body with a spherical head over which is fitted a slipper or shoe, also made of ceramic. As shown in FIGS. 4–6, the piston may be made in two parts, a body and a head, to permit a ceramic ring to be slipped over the shaft of the inverted-key-hole-shaped head.

While known pistons for pressure washer pumps have been generally satisfactory for the purpose, at least those having plural-layer coated construction are not without disadvantages. Chief among them is cost. Such pistons require special, higher-cost materials (stainless or hardened steel) and a special, separately-provided surface coating or treatment. Such coatings and treatments have adverse implications for the manufacturing process and for the manufactured cost of the ready-to-assemble piston.

And pistons made of steel have mass (and, therefore, inertia) which, in view of the invention, is relatively high. Depending in part upon the rotational speed at which the pump is being driven, high-mass pistons may have adverse implications for the size and type of piston return spring and/or for the bearings used in conjunction with the wobble-plate type cam.

An improved piston and method for making such piston and a water pump having an improved piston, all of which address some of the disadvantages and shortcomings of the prior art would represent distinct technological advances in the art.

OBJECTS OF THE INVENTION

An object of the invention is to provide an improved piston for a water pump which overcomes some of the problems and shortcomings of prior art pistons.

Another object of the invention is to provide an improved piston which incorporates very-low-cost material.

Yet another object of the invention is to provide an improved piston which requires no surface coating.

Another object of the invention is to provide an improved water pump piston, the ceramic body of which has uniform surface finish along its length.

Another object of the invention is to provide an improved water pump piston which is easy to manufacture.

Still another object of the invention is to provide a water pump incorporating an improved piston having reduced mass and inertia.

Another object of the invention is to provide an improved method for making a piston for a water pump. How these and other objects are accomplished will become apparent from the following descriptions and from the drawings.

SUMMARY OF THE INVENTION

The invention involves a water pump of the type having at least one piston (and typically several pistons) reciprocating in a pump barrel. The piston includes an elongate, cylindrical piston body extending along a long axis and a piston head attached to the body. In the improvement, the piston body is made entirely of ceramic. Stated another way, the piston body has a generally cylindrical surface and that portion of the body bounded by the surface is homogeneous. Such portion is free of discontinuities, i.e., is solid, both along its length and through its cross-sectional area.

In another aspect of the invention, the body and the head are made of dissimilar materials such as ceramic and steel, respectively. The body has a proximal end and a distal end and the body is substantially cylindrical at the ends and between the ends. The pump has at least one seal and, typically, a plurality of seals around and contacting the piston body. Seal materials including graphite-filled polytetrafluoroethylene (PTFE) and nitrile with molybdenum di-sulfide work well because of the "slipperiness" of such seals. The piston head includes a pocket having a generally cylindrical pocket wall and the proximal end of the piston body is received in such pocket.

In a more specific aspect of the invention, the piston head has a spring retainer flange extending parallel to the long axis. The piston head includes an annular relief groove between the wall and the flange. Such relief groove circumscribes the wall and is instrumental in reducing the forces tending to crush the distal end of the piston body when the head cools after heat treating as described below.

And "shrink-fit" attachment of the head and body to one another is not the only means of attachment. In another embodiment, the piston body and the piston head include, respectively, a body adhesive bonding region and a head adhesive bonding region. Adhesive adheres to both bonding regions and secures the body and the head to one another.

In a variant of the second embodiment, the piston head includes a pocket and the head adhesive bonding region is in the pocket. In another variant, the piston body includes a passage and the body adhesive bonding region is in the passage.

A new method for making a piston for a water pump includes the steps of providing a piston body made of a first material, making a piston head of a second material and having the above-noted pocket formed in it. The head is heated and then the pocket and the body are engaged in overlapping relationship. The head is then allowed to cool.

In a highly preferred aspect of the method, the providing step includes providing a body having a first diameter and the making step includes forming the pocket to have, at ambient temperature, a second diameter slightly less than the first diameter. The heating step includes heating the head until the second diameter is greater than the first diameter.

In a more specific aspect of the method, the head includes a crown portion and a nose portion extending from the crown portion and the heating step includes heat-treating the nose portion to a Rockwell C hardness of at least 40 and preferably to a hardness in the range of 50 to 55 Rockwell C. Heat is permitted to propagate to the crown portion (including the pocket wall) to enlarge the pocket to a size to accept the proximal end of the piston body.

In a highly preferred method, the making step includes forming the piston head to include (a) a relief groove circumscribing the pocket, (b) a wall defining the pocket and having a root portion and a distal lip spaced from the root portion, and (c) a relief groove circumscribing the wall and extending generally to the root portion. The making step also includes forming the piston head to have a radially-outwardly-extending retainer ring and a retainer flange extending generally parallel to the axis and coacting with the ring for positionally retaining a spring.

But the piston need not be made only by using shrink-fit attachment. A variant method for making a piston for a water pump includes the steps of providing a piston body made of a first material and having a body adhesive bonding region thereon, making a piston head of a second material and having a head adhesive bonding region thereon and applying adhesive to at least one of the bonding regions. The pocket and the body are engaged in overlapping relationship and the adhesive is allowed to harden.

Other aspects of the invention are set forth in the following detailed description and in the drawings.

DETAILED DESCRIPTION OF PREFERRED EMBODIMENTS

Figure 1:
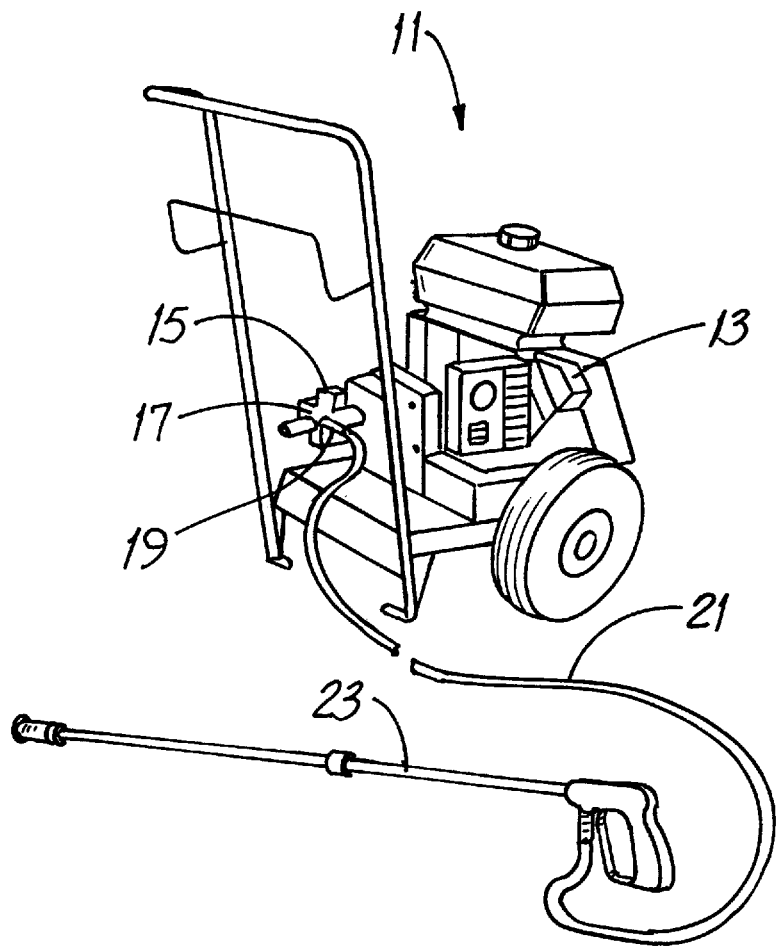
FIG. 1 is a perspective view of an exemplary pressure washer. Parts are broken away.
Figure 2:
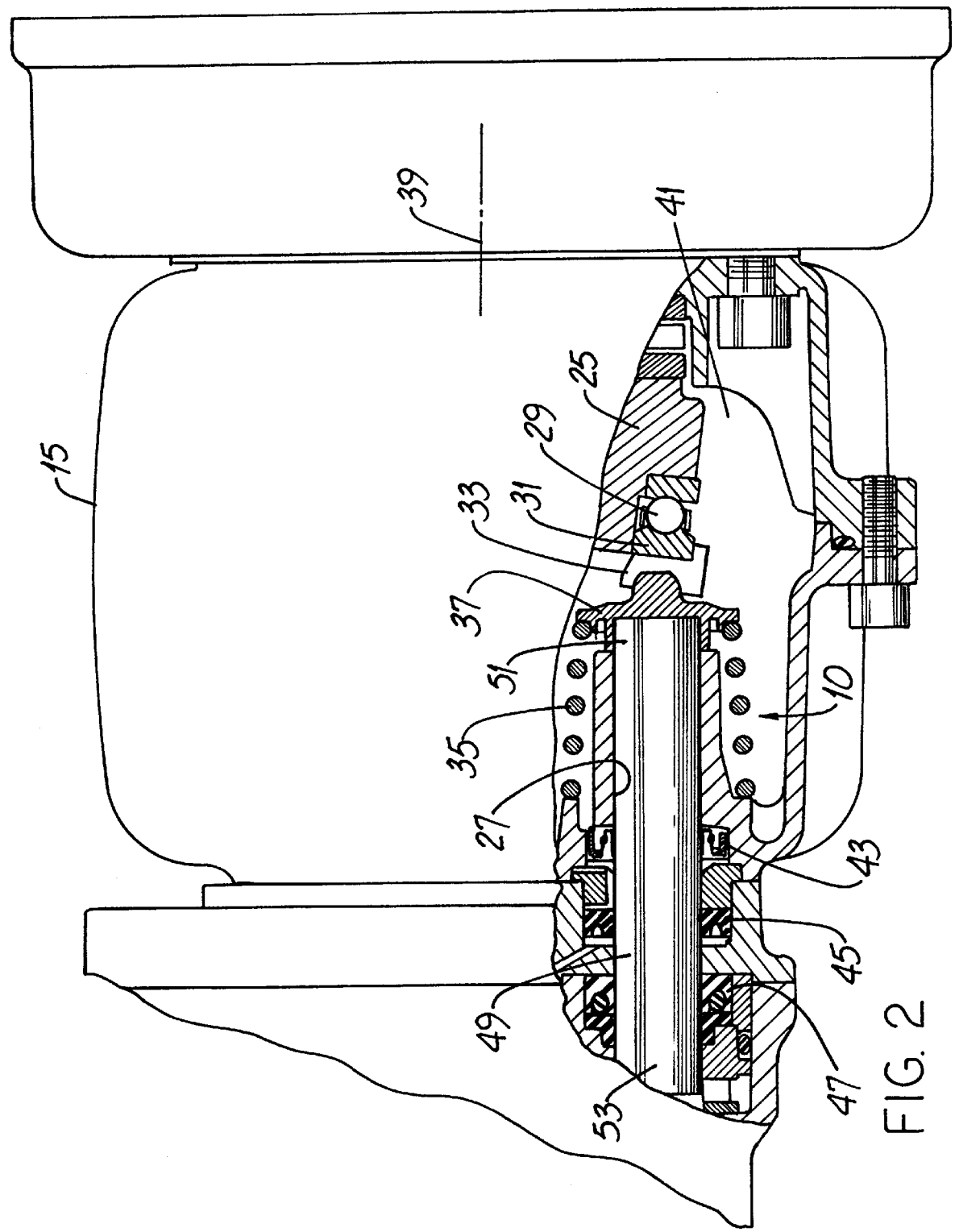
FIG. 2 is a partial-cross-section elevation view of an exemplary water pump, a component of the pressure washer of FIG. 1. Parts are broken away.
Figure 3:
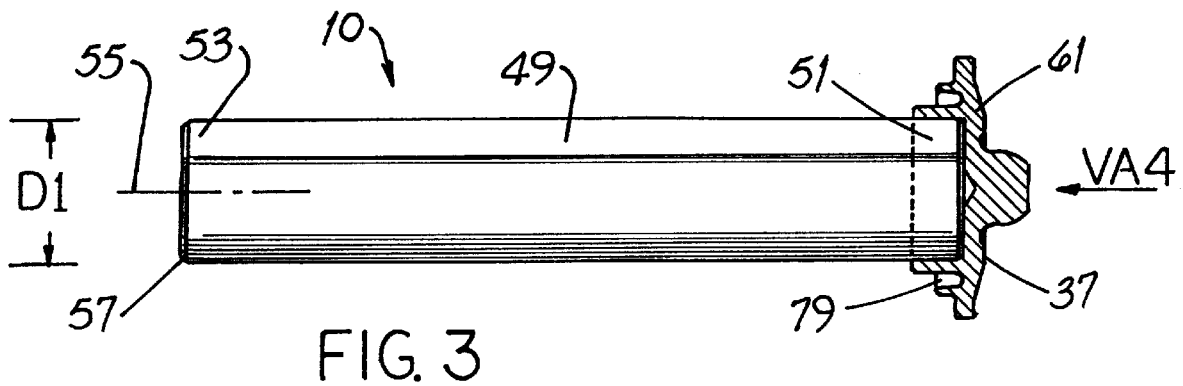
FIG. 3 is a side elevation view of one embodiment of the new piston. The piston body is shown in full representation and the head is shown in cross-section.
Figure 4:
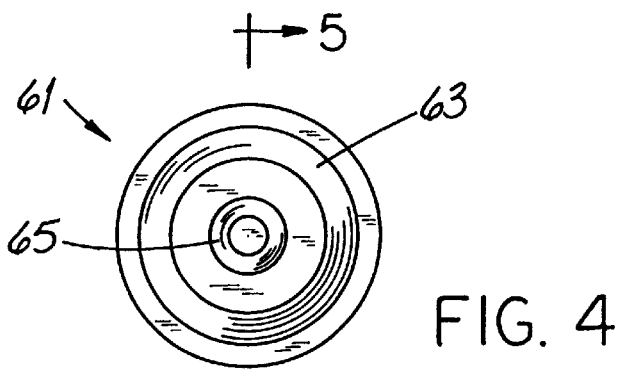
FIG. 4 is a full-representation elevation view of the head shown in FIG. 3 taken along the viewing axis VA4 thereof.
Figure 5:
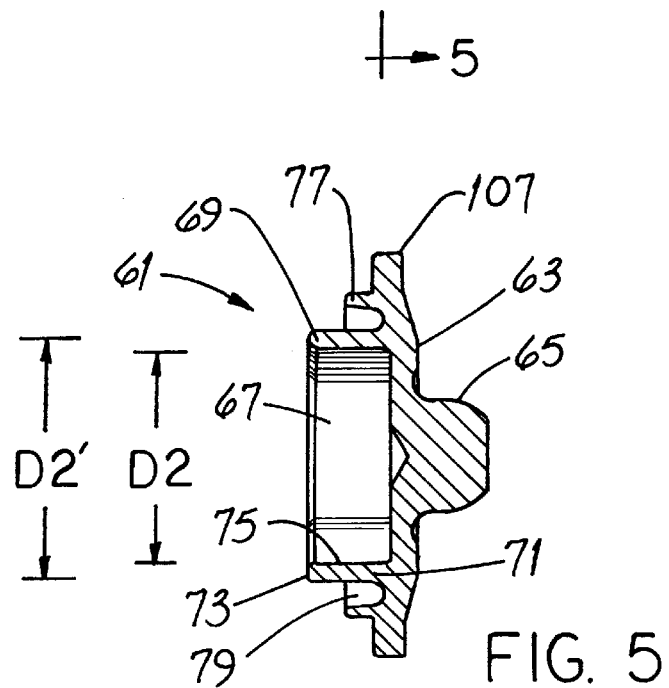
FIG. 5 is an enlarged cross-section view of the piston head shown in FIGS. 3 and 4.
Figure 6:
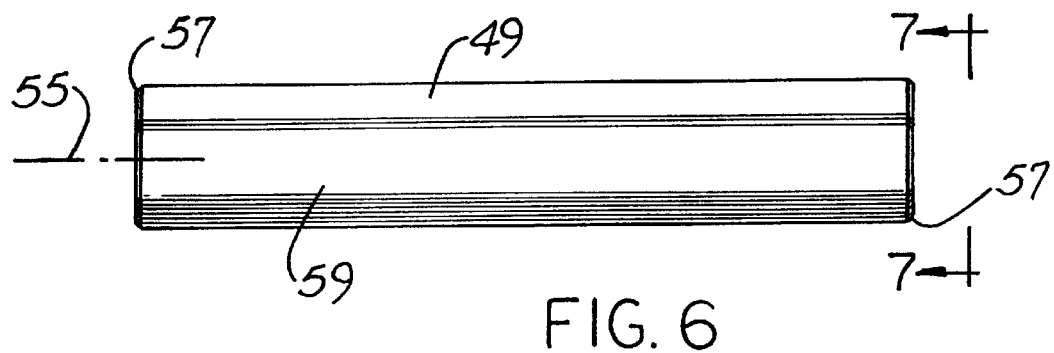
FIG. 6 is a side elevation view, shown in full representation, of the body of the new piston.
Figure 7:
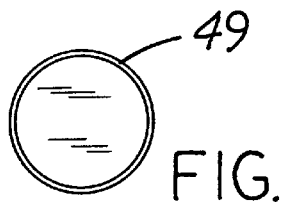
FIG. 7 is an end elevation view of the body of FIG. 6 taken along the viewing plane 7—7 thereof.

Before describing the new piston 10 and related method, it will be helpful to have an understanding of some aspects of a pressure washer 11. Referring to FIGS. 1 and 2, the pressure washer 11 includes a prime mover 13 (an internal combustion engine in the drawing) to which is coupled a high-pressure water pump 15. The pump 15 has an inlet 17 to which a source of water, e.g., a garden hose, is attached and water at high pressure is discharged from the outlet port 19 to a hose 21 connected to a hand-manipulated spray wand 23.

The new piston 10 is used in the water pump 15 and a few aspects of such pump 15 will now be described. The water pump 15 is attached to the prime mover 13, the drive shaft of which is coupled to an angled cam 25. The pistons 10 are slideably received in respective bores 27 and the cam 25 sequentially reciprocates the pistons 10 in their bores. The pump 15 includes a cam bearing 29 with a flat, ring-like, annular thrust plate 31. The shoes 33 of the pistons 10 contact and "ride on" such plate 31.

In sequence, the pistons 10 are moved leftwardly by the rotating cam 25 and returned rightwardly by respective piston return springs 35 acting upon the piston head 37. It is to be appreciated that spring force retains the piston shoe 33 against the plate 31. The general arrangement of the pump described above is known per se and it is to be appreciated that only one of the pump pistons 10 is shown in FIG. 2. An exemplary pump 15 has three pistons 10 spaced equidistant from the pump axis of rotation 39.

For a given piston 10, piston spring 35 and piston spacing from the pump rotational axis 39, there is an upper limit to the speed at which the pump 15 can be driven and still reliably spring-retain the shoes 33 in contact with the plate 31. As will become apparent from the description below, the new piston 10 has favorable implications for increasing such upper limit.

Because the plate 31 is not coupled to the prime mover 13 and because there is very little viscous drag imposed on such plate 31, the plate 31 rotates at very low speed. As a consequence, friction-related forces which otherwise may impose significant bending loads upon the ends of the pistons 10 are very low. Stated another way, the force imposed upon each piston 10 by the plate 31 is substantially entirely axial.

The pump cavity 41 has a quantity of oil therein for lubrication and cooling purposes. The pump 10 has at least one seal and, typically, a plurality of seals 43, 45, 47 around and contacting the piston body 49. The seal 47 is preferably Parker Packing Div. FS-1078 which has graphite-filled PTFE. The seal 45 is preferably Parker Seal 4274-8506006625 which includes 85 Durometer nitril loaded with molybdenum disulfide. The oil seal 43 is preferably Transcom TC4 which includes carboxylated nitril, 80 Durometer. The seals 43, 45, 47 function as a barrier between the cavity 41 and the proximal end 51 of the piston 10 on one hand and, on the other hand, the water being pumped at the piston distal end 53.

Referring next to FIGS. 3 through 7, details of the new piston 10 and method for making such piston 10 will now be set forth. The piston 10 includes an elongate, cylindrical piston body 49 extending along a long axis 55. But for small chamfers 57 at the proximal and distal ends 51 and 53, respectively, the body 49 is of uniform diameter D1 along its length. The surface 59 is preferably finished to 0.14 to 0.22 micrometer Ra along its entire length.

The piston body 49 is made entirely of ceramic, i.e., aluminum oxide powder and a binder. In other words, the piston body 49 has a generally cylindrical surface 59 and that portion of the body 49 bounded by the surface 59 is homogeneous and is free of discontinuities, i.e., the body 49 is solid ceramic. A suitable ceramic is Coors Ceramics FG-995.

The piston head 61 includes a crown portion 63, a nose 65 extending from such portion 63 in a direction away from the body 49. The head 61 also has a pocket 67 with an annular pocket wall 69 extending from the wall root portion 71 toward the distal end 53 and terminating in a distal wall lip 73. A suitable finish for the interior wall surface 75 is about 0.8 micrometers. An annular spring retainer flange 77 is generally parallel to the body long axis 55 and, like the wall 69, also extends toward the distal end 53 in a direction generally parallel to the axis 55.

Notably, the piston head 61 includes an annular relief groove 79 between the wall 69 and the flange 77. Such relief groove 79 circumscribes the wall 69, is interposed between the wall 69 and the flange 77, is concentric with the wall 69, the flange 77 and when mounted on the body 49, with the axis 55. Such groove 79 is instrumental in reducing the forces otherwise tending to crush the proximal end 51 of the piston body 49 when the head 61 cools after heat treating as described below.

Figure 8:
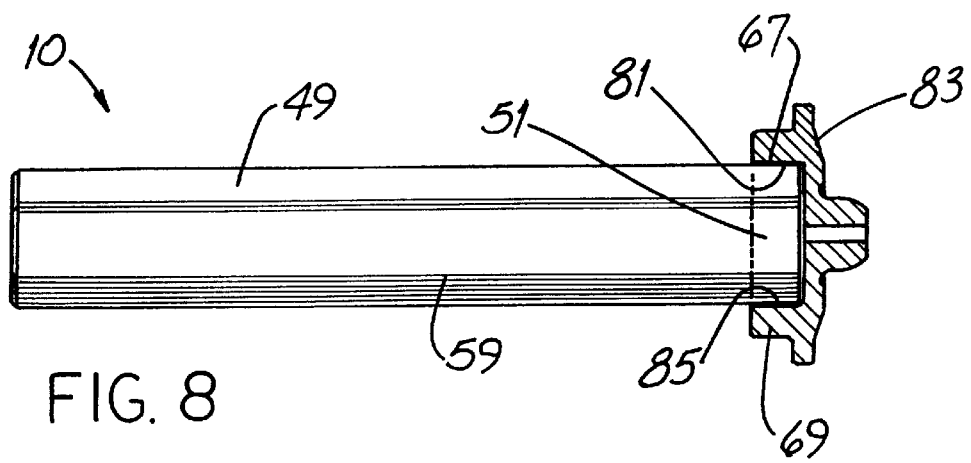
FIG. 8 is a side elevation view of another embodiment of the new piston. The piston body is shown in full representation and the head is shown in cross-section.

Another embodiment of the new piston 10 will now be described. Referring to FIG. 8, the piston body 49 includes a body adhesive bonding region 81 around the circumferential surface 59 at the proximal end 51. The head 83 includes a pocket 67 and the head adhesive bonding region 85 is in the pocket 67 and, specifically, is on the wall 69 of the pocket 67. Adhesive adheres to both bonding regions 81, 85 and secures the body 49 and the head 83 to one another. The preferred thickness of adhesive between the head 83 and the body 49 is about 0.002 inches and a preferred adhesive is Permabond ESP-308 epoxy available from Permabond International of Englewood, N.J.

Figure 9:
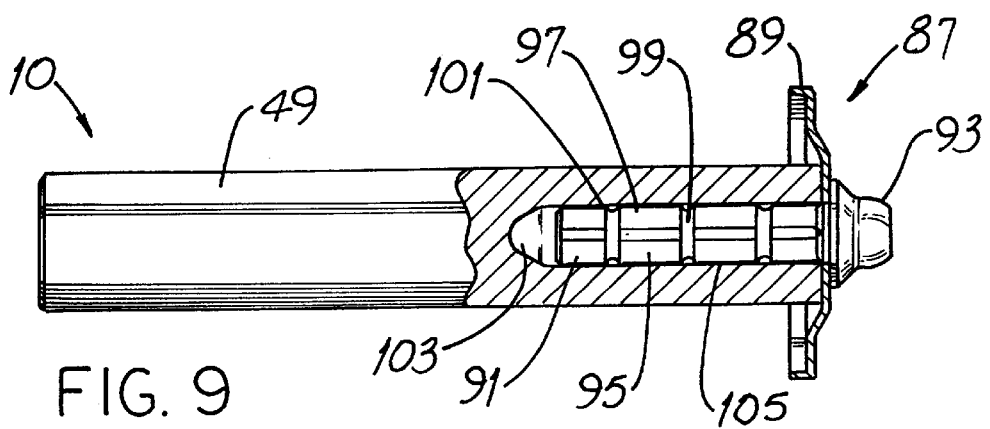
FIG. 9 is a side elevation view of yet another embodiment of the new piston. The piston body is shown in partial cross-section, the retainer plate is shown in cross-section and the plate retention stem is shown in full representation.

A third embodiment of the new piston 10 is shown in FIG. 9. The piston head 87 includes a spring retainer plate 89 and a plate retention stem 91 attached concentrically to the plate 89. The stem 91 has a nose 93 and a stem securing portion 95 and the plate 89 is interposed between the nose 93 and the portion 95. The portion 95 has a plurality of cylindrical lands 97 separated by annular grooves 99, such lands 97 and grooves 99 comprise the stem bonding region 101 and adhesive adheres to both the lands 97 and the grooves 99. The piston body 49 includes a hole 103 sized to receive the retention stem 91 with slight clearance. The body adhesive bonding region 105 is in the hole 103 and the head 87 and body 49 may be secured to one another using the Permabond epoxy noted above.

The embodiment shown in FIGS. 2 through 7 works well in operating environments of 260°–270° F. and the embodiments of FIGS. 8 and 9 and work well in such environments up to about 200°–210° F. But as new adhesives are developed, it is expected that the temperature-related operating capabilities of the latter embodiments will increase.

A new method for making a piston 10 for a water pump 15 includes the steps of providing a piston body 49 made of a first material, making a piston head 37 of a second material and having the above-noted pocket 67 formed in it. The head 61 is heated and then the pocket wall 69 and the body 49 are engaged in overlapping relationship. The head 37 is then allowed to cool.

In a highly preferred aspect of the method, the providing step includes providing a body 49 having a first diameter D1 and the making step includes forming the pocket 67 to have, at ambient temperature, a second diameter D2 slightly less than the first diameter D1. The heating step includes heating the head 37 until the second diameter D2' is greater than the first diameter D1.

In a more specific aspect of the method, the head 37 includes a crown portion 63 and a nose 65 extending from the crown portion 63. The heating step includes heat-treating the nose 65 to a Rockwell C hardness of at least 40 and preferably to a hardness in the range of 50 to 55 Rockwell C. Heat is permitted to propagate to the crown portion 63 and to the pocket wall 69 to enlarge the diameter D2 of the pocket 67 to a diameter D2' to accept the proximal end 51 of the piston body 49 with sliding clearance.

In a highly preferred method, the making step includes forming the piston head 61 to include (a) a relief groove 79 circumscribing the pocket 67, (b) a wall 69 defining the pocket 67 and having a root portion 71 and a radially distal lip 73 spaced from the root portion 71. The relief groove 79 circumscribes the wall and extends generally to the root portion 71. The making step also includes forming the piston head 67 to have a radially-outwardly-extending retainer ring 107 and a retainer flange 77 extending generally parallel to the axis 55 and coacting with the ring 107 for positionally retaining a piston return spring 35.

As noted above, the pocket diameter D2 prevailing at, say, ambient temperature, increases to D2' when the head 61 is heated. It is to be appreciated that as the head 61 is allowed to cool after the proximal end 51 of the body 49 has been seated in the pocket 67, very substantial radially-inwardly-directed forces are developed if "shrinkage" or contraction of the wall 69 back to a pocket diameter D2 is resisted. The presence of the body proximal end 51 in the pocket 67 provides such resistance. It has been discovered that the inclusion of the relief groove 79 as described above has a marked effect in reducing the magnitude of such forces and preventing the proximal end 51 from being "hairline fractured" or crushed.

Another aspect of the invention involves a method using adhesive for making a piston 10. Such method includes the steps of providing a piston body 49 made of a first material and having a body adhesive bonding region 81. A piston head 83 is made of a second material and has a head adhesive bonding region 85. Adhesive is applied to at least one of the bonding regions 81, 85 and the bonding regions 81, 85 are urged into engagement with one another. The adhesive is then allowed to harden.

In a more specific aspect, the piston head 83 includes a pocket 67 and the head adhesive bonding region 85 is in the pocket 67. And in an alternative aspect, the piston body 49 includes a hole 103 and the body adhesive bonding region 105 is in the hole 103.

While the principles of the invention have been shown and described in connection with specific embodiments, it is to be understood clearly that such embodiments are by way of example and are not limiting.

What is claimed is:

1. In a piston for a water pump and wherein the piston includes a cylindrical piston body extending along a long axis and a piston head, the improvement wherein:
   the piston body has a substantially uniform diameter along its entire length;
   the piston body is ceramic and the body diameter is significantly less than the body length along the long axis;
   the piston body has a proximal end and the head is around the proximal end and thereby secured to the body;
   the head is metal and includes a wall contacting the proximal end along the length of the wall, such wall defining a cylindrical pocket receiving the proximal end;
   the head includes a rounded protruding nose portion configured to be fitted to a shoe contacting the nose portions; and
   the piston head has a retainer flange extending parallel to the long axis and includes an annular relief groove between the wall and the flange.

2. The piston of claim 1 wherein the groove circumscribes the wall.

3. In a piston for a water pump and wherein the piston includes a piston body extending along a long axis and a piston head, the improvement wherein:
   the piston body is homogeneous ceramic and has a proximal end, a distal end, a length between the ends and a generally cylindrical surface extending between the ends;
   the surface has a generally uniform surface finish along the length; and
   the piston includes a metal head secured to the body and having a protruding nose portion, a retainer flange extending parallel to the long axis, a pocket having a generally cylindrical pocket wall and an annular relief groove between the wall and the flange.

4. The piston of claim 3 wherein the groove circumscribes the wall.

* * * * *

UNITED STATES PATENT AND TRADEMARK OFFICE
CERTIFICATE OF CORRECTION

PATENT NO. : 5,890,413

DATED : April 6, 1999

INVENTOR(S) : Bayer, et al.

It is certified that error appears in the above-identified patent and that said Letters Patent is hereby corrected as shown below:

On the title page, item[54]:

delete the title of the application "PISTON FOR WATER PUMP AND RELATED METHOD"
and replace it with --PISTON FOR WATER PUMP--.

Signed and Sealed this

Third Day of August, 1999

Attest:

Q. TODD DICKINSON

*Attesting Officer*     *Acting Commissioner of Patents and Trademarks*